Figures 1, 2:
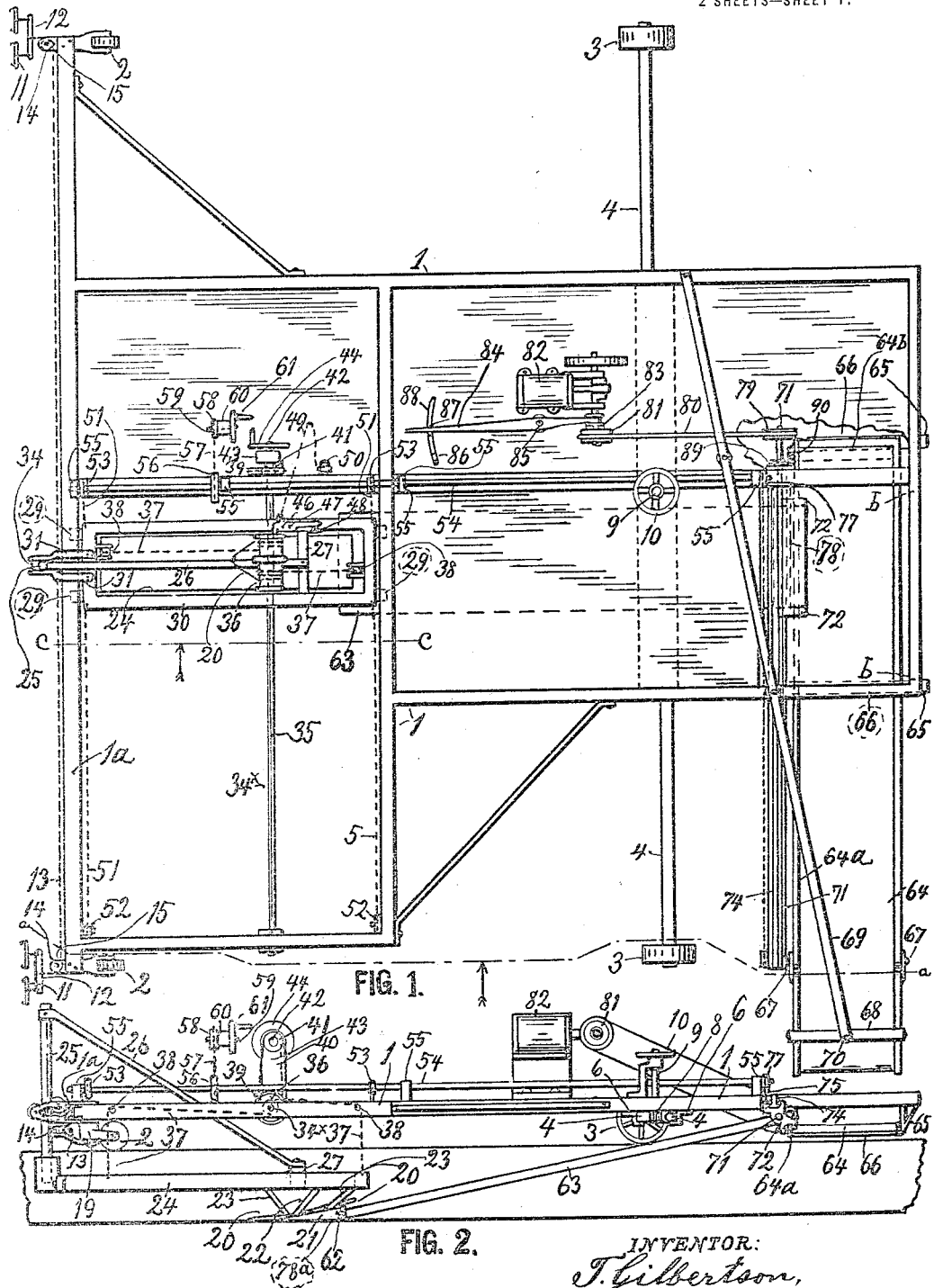

T. GILBERTSON.
DITCHING AND GRADING MACHINE.
APPLICATION FILED DEC. 30, 1916.

1,244,319. Patented Oct. 23, 1917.
2 SHEETS—SHEET 1.

INVENTOR:
T. Gilbertson,
BY his ATTORNEY:
A. M. Carlsen.

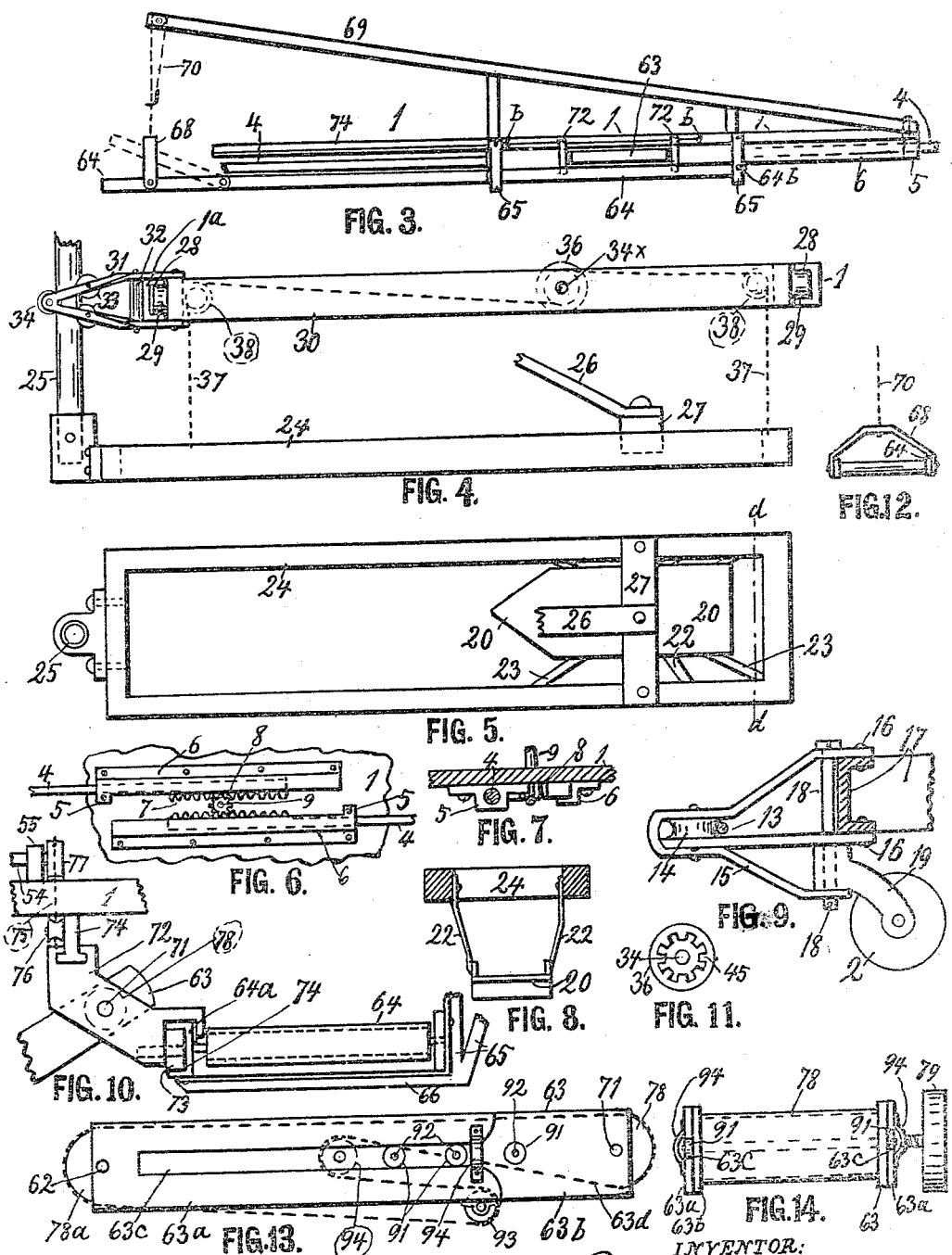

UNITED STATES PATENT OFFICE.

THEODORE GILBERTSON, OF PELICAN RAPIDS, MINNESOTA.

DITCHING AND GRADING MACHINE.

1,244,319.

Specification of Letters Patent.

Patented Oct. 23, 1917.

Application filed December 30, 1916. Serial No. 139,960.

*To all whom it may concern:*

Be it known that I, THEODORE GILBERTSON, a citizen of the United States, residing at Pelican Rapids, in the county of Ottertail and State of Minnesota, have invented a new and useful Ditching and Grading Machine, of which the following is a specification.

My invention relates to ditching and grading machines, and the general object is to provide a machine of said class highly improved by the various features hereinafter described and pointed out in the claim.

In the accompanying drawings, Figure 1 is a plan view of the improved machine. Fig. 2 is a sectional side elevation on the line $a$—$a$ in Fig. 1 with a few parts omitted. Fig. 3 is a rear end view of the frame with a portion of the rear-most frame bar broken away as between the points $b$—$b$ in Figs. 1 and 3. Fig. 4 is an enlarged sectional side elevation on the line $c$—$c$ in Fig. 1 with the plow omitted. Fig. 5 is a plan view of the plow frame shown in Fig. 4, with the plow added. Fig. 6 is a bottom view of a portion of the main frame, showing the gear arrangement by which the main axle is extended and contracted. Fig. 7 is a right hand end view of Fig. 6 with frame in normal position. Fig. 8 is a rear sectional view on the line $d$—$d$ in Fig. 5. Fig. 9 is an enlarged side elevation of the left front corner of the machine showing the structure of the front corner casters and the draft arrangement. Fig. 10 is an enlarged rear portion of Fig. 2. Fig. 11 is a right end view of the rope drum by which the plow is raised and lowered. Fig. 12 is a side elevation of the bail by which the left end section of the transverse rear conveyer is raised and lowered. Fig. 13 is an enlarged left hand side view of the longitudinal conveyer of the machine. Fig. 14 is a right hand end view of Fig. 13.

Referring to the drawing by reference numerals, 1 designates the main frame of the machine, the same is mounted on two front casters 2, 2, and two supporting wheels 3, 3, on an axle which is made up of two over lapped sections 4, 4, slidable in bearings 5, 5. (See Figs. 6 and 7). The inner portion of each section is square or oblong in cross section, is guided in a channel 6 and provided with teeth 7 so as to constitute a rack. The racks thus formed are engaged by a pinion 8 fixed on a vertical shaft 9 having a hand wheel 10, (see Fig. 2) the turning of which will thus cause the ground wheels to be spread or closed as may be desired for digging wide or narrow ditches.

The machine may be drawn by draft animals hitched to swingle trees 11 having double-trees 12 attached one to each end of a chain 13, which extends across the front of the frame and is guided by sheaves 14, the latter being mounted in brackets 15 (best shown in Fig. 9), secured at 16 to the front corners of the frame and of such construction that they form bearings for vertical bolts 18, on whose lower ends are journaled the forks 19 of the caster wheels 2. This construction enables the chain or cable 13 to both pull at the lower end of the bolt 18 where the pull is most desired, and also to thereby support the caster bracket against rearward strain when the machine is moving forward.

The digging is done by a plow or shovel 20 having a landside 21 and sloping knives 22 and braces 23, all secured to a yoke shaped plow frame 24. Said plow frame has its front end provided with a preferably hollow upright 25, steadied by a brace 26 which extends from the upper end thereof to a cross bar 27 of the plow frame.

In Fig. 4 is best shown how the main frame may be made of channel iron, in whose adjacent side grooves 28 are mounted to roll anti-friction rollers 29 on studs at the front and rear ends of a plow-supporting yoke-shaped frame 30. To the front end of said frame are secured two brackets 31 which loosely embrace the front bar $1^a$ of the main frame, and in said brackets are mounted two vertical rollers 32, bearing against the front of bar $1^a$, and two grooved rollers 33 guiding the rear side of the upright 25, and one grooved roller 34 guiding at the front side of said upright.

Journaled in the carrier frame 30 and in the main frame is a transversely disposed shaft $34^x$, having all along it a key way 35, in which slides a key (not shown) fixed in a cable drum 36, located within the frame 30 and having wound upon it two cables 37, which are guided over sheaves 38 mounted in frame 30, and extend thence downward and are attached one to each end of the plow frame.

Secured on one end of the shaft $34^x$ is a sprocket 39 driven by a chain 40 and a smaller sprocket 41 fixed on a shaft 42, which is mounted in a post 43 and provided with a hand wheel 44, so that the turning of said hand wheel will raise and lower the plow frame regardless of its position toward either side of the main frame. In order to hold the cable drum or double drum with the plow frame at the desired elevation, one end of the drum is provided with notches 45 (see Fig. 11) for a dog 46, (see Fig. 1) pivoted at 47 to engage with one end when the other end is pressed outward by a spring 48. Said dog is disengaged by pulling on a cord 49, the idle part of which may be coiled upon a peg or hook 50.

The plow carrying frame or carriage 30 is at each end attached to a chain 51, which is guided over sheaves 52 and operated by sprockets 53 fixed on a shaft 54, which in bearings 55 extends in longitudinal direction of the main frame and is provided with a sprocket 56, rotated by an endless chain 57 and a sprocket 58 fixed on a shaft 59 journaled in a post 60 and having a hand wheel 61. Pivoted at 62 (see Fig. 2) to the rear end of the plow is the forward end of an endless conveyer 63, whose rear end always remains above the ground so as to convey the earth from the plow onto a transverse rear conveyer 64, which discharges the earth or dirt upon the ground beyond the left side of the machine. The latter conveyer is supported from the main frame by brackets 65 having forwardly extending arms 66. The delivery end portion of said conveyer is pivoted at 67 so it may be raised with its outer end above the earth it has delivered. For purpose of such raising it it provided with a bail 68 suspended from the end of a frame arm 69 by an adjustable chain or rope 70.

The drive shaft 71 of the conveyer 63 is journaled in hangers 72 (best shown in Fig. 10) which are guided on the adjacent side bar 64$^a$ of the rear conveyer 64, and are provided with antifriction rollers 73 moving in the channel 74 of said bar. The upper ends of said hangers are slidably supported on a frame bar 74 and are engaged to be moved by a chain 75, which is suitably guided by pulleys like 76 in Fig. 10 and driven by a sprocket 77 fixed on the shaft 54 so that the main conveyer moves laterally with the plow whenever the latter is moved by turning of the hand wheel 61.

The roller 78 of the main conveyer is slidably keyed on the shaft 71 and said shaft is provided with a pulley 79, driven by a belt 80 from a clutch pulley 81 loose on the shaft of an engine 82 which is mounted upon the main frame, and is provided with a clutch member 83 controlled by a shifter 84, fulcrumed at 85 and shiftable into two notches 86, 87, of a segment 88, so as to start and stop the conveyer while the engine is running. On the conveyer shaft 71 is fixed a mitergear 89 meshing with a mitergear 90 fixed on the roller 64$^b$ of the rear conveyer, whereby the two conveyers are driven in unison and at equal speed.

In order that the plow may be raised and lowered without interfering with the position and elevation of the rear end of the main conveyer, the latter conveyer is made automatically extensible as shown in Figs. 13 and 14, where it will be seen that the conveyer frame is composed of two sections 63$^a$, 63$^b$, slidable one in the other; section 63$^a$ having at each side a slot 63$^c$, the edges of which guide antifriction rollers 91 rotatably mounted on studs 92 upon the inner section 63$^b$. 94 are arched braces to reinforce the boards weakened by the slots or deep notches 63$^c$. Across the underside of the section 63$^a$ is journaled a roller 93 and inside the section 63$^b$ is journaled roller 94. The endless conveyer canvas 63$^d$ is placed over the end rollers 78, 78$^a$ and back and forth over the rollers 93 and 94 in the manner shown in Fig. 13, with the result that the canvas is always kept stretched and the length of its upper run will be automatically changed as the plow works near the surface or at different depths below the surface.

In the building of the machine it is obviously immaterial whether the shaft 54 be placed above or below or through the main frame, and whether the plow carrying frame supported in the main frame proper or in transverse channel bars secured underneath said frame. Also the rear bar 74 may be secured to the underside of the main frame if so desired; all of such and similar changes I consider as mechanical equivalents of the arrangement shown and thus coming within the scope and spirit of my invention.

The operation of the machine is already fairly clear from the foregoing specification; yet it may be further stated that in digging ditches or trenches or grading roads, the plow is lowered the desired depth for the first cut and as the machine is driven alternately in the opposite directions along the road the plow is moved over laterally at each turn of the machine until the first layer is removed, the plow is then lowered and the operation repeated until the desired depth is reached and the road or trench thus completed, when the plow is raised above the surface so the machine may be driven to some new place of operation.

I claim:

In a machine of the class described, a wheel supported main frame, a plow-carrier frame guided to move transversely in the front portion of the main frame, and means mounted on the main frame for moving said plow-carrier frame sidewise in either direction, a plow frame adjustably suspended below said carrier frame and having a vertical standard slidable in the front part of the plow-carrier frame, and means carried by the plow carrier frame for raising and lowering the plow frame, said plow carrier frame extending forward above and below the front cross bar of the main frame and having there antifriction rollers against said front frame bar and grooved rollers rotating about horizontal axes and guiding the front and rear sides of the standard, and a slanting brace extending from the upper end of the standard to the near portion of the plow frame.

In testimony whereof I affix my signature.

THEODORE GILBERTSON.

Copies of this patent may be obtained for five cents each, by addressing the "Commissioner of Patents, Washington, D. C."